US010764232B1

(12) United States Patent
Yanes et al.

(10) Patent No.: US 10,764,232 B1
(45) Date of Patent: Sep. 1, 2020

(54) PREDICTING PREFERRED COMMUNICATION PATTERNS

(71) Applicant: Fuze, Inc., Boston, MA (US)

(72) Inventors: Leopoldo E Yanes, Boston, MA (US);
Hadi Chemaly, Boston, MA (US);
Michael Affronti, Boston, MA (US);
Jedidiah Brown, Boston, MA (US);
Keith Johnson, Boston, MA (US)

(73) Assignee: Fuze, Inc., Boston, MA (US)

( * ) Notice: Subject to any disclaimer, the term of this patent is extended or adjusted under 35 U.S.C. 154(b) by 277 days.

(21) Appl. No.: 15/723,956

(22) Filed: Oct. 3, 2017

(51) Int. Cl.
*H04L 12/58* (2006.01)
*H04L 29/08* (2006.01)
*H04L 29/06* (2006.01)

(52) U.S. Cl.
CPC ............ *H04L 51/36* (2013.01); *H04L 51/046* (2013.01); *H04L 67/22* (2013.01); *H04L 67/24* (2013.01); *H04L 67/42* (2013.01)

(58) Field of Classification Search
CPC .. G06F 3/038; G06F 9/541; G06F 2203/0381; H04L 51/046; H04L 51/066; H04L 51/36; H04L 51/043; G06Q 10/10
See application file for complete search history.

(56) References Cited

U.S. PATENT DOCUMENTS

| | | | | | |
|---|---|---|---|---|---|
| 7,606,864 | B2 * | 10/2009 | Koch | ..................... | G06Q 10/10 707/999.104 |
| 8,793,311 | B2 * | 7/2014 | Watanabe | .............. | G06Q 10/10 379/88.1 |
| 8,881,020 | B2 * | 11/2014 | Affronti | .................. | G06F 3/038 715/744 |
| 9,462,438 | B2 * | 10/2016 | Warr | ..................... | H04M 3/436 |
| 2002/0075306 | A1 * | 6/2002 | Thompson | ............ | G06F 3/0481 715/753 |
| 2002/0087704 | A1 * | 7/2002 | Chesnais | ................. | H04L 29/06 709/228 |
| 2005/0009541 | A1 * | 1/2005 | Ye | ........................ | G06Q 10/107 455/466 |
| 2005/0130641 | A1 * | 6/2005 | Lorraine Scott | .... | H04M 1/2746 455/418 |
| 2006/0041648 | A1 * | 2/2006 | Horvitz | ................ | G06Q 10/107 709/220 |
| 2009/0003569 | A1 * | 1/2009 | Forbes | .................. | H04M 15/06 379/142.07 |

(Continued)

*Primary Examiner* — Benjamin M Thieu
(74) *Attorney, Agent, or Firm* — McDermott Will & Emery LLP

(57) ABSTRACT

Methods for predicting preferred communications patterns are provided. In one aspect, a method includes receiving a request from a first user to initiate communication with a second user by a first communication method, determining a communication preference hierarchy of the second user based on a plurality of factors concerning the second user, wherein the plurality of factors include a presence state, selecting a second communication method from the communication preference hierarchy, wherein the second communication method is preferred over the first communication method in the communication preference hierarchy, and in response to the request from the first user, providing a recommendation to the first user to communicate with the second user by the second communication method. Systems and machine-readable media are also provided.

16 Claims, 8 Drawing Sheets

(56) References Cited

U.S. PATENT DOCUMENTS

| | | | |
|---|---|---|---|
| 2009/0028179 A1* | 1/2009 | Albal | G06Q 10/10 |
| | | | 370/465 |
| 2009/0170480 A1* | 7/2009 | Lee | H04L 51/36 |
| | | | 455/414.1 |
| 2010/0082801 A1* | 4/2010 | Patel | G06F 15/16 |
| | | | 709/224 |
| 2011/0058666 A1* | 3/2011 | Salis | H04M 3/42374 |
| | | | 379/399.01 |
| 2014/0164909 A1* | 6/2014 | Graff | G06F 16/957 |
| | | | 715/234 |
| 2016/0173422 A1* | 6/2016 | Kidron | G06Q 10/107 |
| | | | 705/7.19 |
| 2017/0034649 A1* | 2/2017 | Dotan-Cohen | H04W 24/02 |
| 2017/0041283 A1* | 2/2017 | Guo | H04L 51/26 |

* cited by examiner

PREDICTING PREFERRED COMMUNICATION PATTERNS

TECHNICAL FIELD

The present disclosure generally relates to communications systems, and more specifically relates to predicting preferred communications patterns for improving utilization of communication systems.

BACKGROUND

Users often have a preferred method of communication, whether that method is a phone call, text message, e-mail, video conference, instant message, or some other form of communication. If a first user is initiating a communication to a second user using the second user's preferred method of communication, the second user is more likely to be receptive to the communication, reducing unnecessary back and forth failed communication attempts, and enhancing responsiveness between the two users. However, a user's preferred communication methods may change according to various factors. Accordingly, users may be less likely to utilize available communication systems in an effective manner.

The description provided in the background section should not be assumed to be prior art merely because it is mentioned in or associated with the background section. The background section may include information that describes one or more aspects of the subject technology.

SUMMARY

The disclosed system provides for predicting preferred communication patterns. Users may utilize a communications system that supports multiple methods of communication. The communications system can track several data points for all users on the communications system, including presence, real-time activity, communication history, location, calendar, device states, and group relationships. When a sender indicates a desire to contact a receiver through the communications system, the communications system can predict a preferred communication method of the receiver based on one or more of the tracked data points. If the sender indicates attempting use of a non-preferred communication method, the communications system can provide a recommendation to the sender to use the preferred communication method.

According to certain aspects of the present disclosure, a system is provided. The system includes a means for receiving a request from a first user to initiate communication with a second user by a first communication method, for determining a communication preference hierarchy of the second user based on a plurality of factors concerning the second user, wherein the plurality of factors includes a presence state, for selecting a second communication method from the communication preference hierarchy, wherein the second communication method is preferred over the first communication method in the communication preference hierarchy, and for providing, in response to the request from the first user, a recommendation to the first user to communicate with the second user by the second communication method.

According to certain aspects of the present disclosure, a computer-implemented method is provided. The method includes receiving a request from a first user to initiate communication with a second user by a first communication method. The method also includes determining a communication preference hierarchy of the second user based on a plurality of factors concerning the second user, wherein the plurality of factors includes a presence state. The method also includes selecting a second communication method from the communication preference hierarchy, wherein the second communication method is preferred over the first communication method in the communication preference hierarchy. The method also includes providing, in response to the request from the first user, a recommendation to the first user to communicate with the second user by the second communication method.

According to certain aspects of the present disclosure, a system is provided including a memory including a plurality of factors concerning a second user, and a processor configured to execute instructions. When executed, the instructions cause the processor to receive a request from a first user to initiate communication with the second user by a first communication method. The instructions also cause the processor to determine a communication preference hierarchy of the second user based on the plurality of factors concerning the second user, wherein the plurality of factors include a presence state and at least one of real-time activity, communication history, location, calendar, device states, or group relationships. The instructions also cause the processor to select a second communication method from the communication preference hierarchy, wherein the second communication method is preferred over the first communication method in the communication preference hierarchy. The instructions also cause the processor to provide, in response to the request from the first user, a recommendation to the first user to communicate with the second user by the second communication method.

According to certain aspects of the present disclosure, a non-transitory machine-readable storage medium comprises machine-readable instructions for causing a processor to execute a method. The method includes receiving a request from a first user to initiate communication with a second user by a first communication method. The method also includes determining a communication preference hierarchy of the second user based on a plurality of factors concerning the second user, wherein the plurality of factors include a presence state and at least one of real-time activity, communication history, location, calendar, device states, or group relationships. The method also includes selecting a second communication method from the communication preference hierarchy, wherein the second communication method is preferred over the first communication method in the communication preference hierarchy. The method also includes providing, in response to the request from the first user, a recommendation to the first user to communicate with the second user by the second communication method, wherein the recommendation is provided to the first user using the first communication method.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
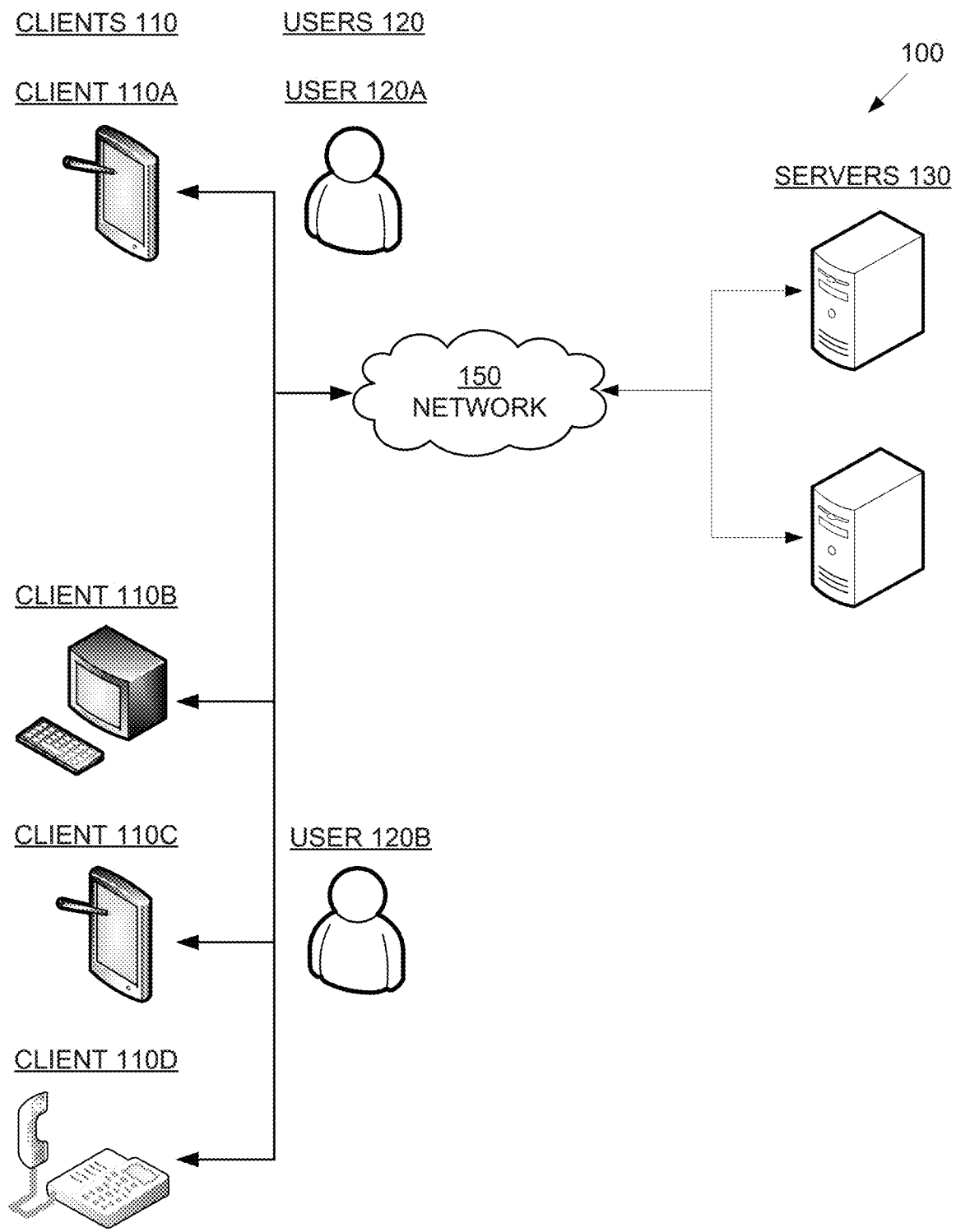
FIG. 1 illustrates an example architecture for predicting preferred communication patterns.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

When deciding on a communication method, it is often difficult for a sender to correctly predict the receiver's preferred method of communication. When the sender uses a non-preferred method of communication, the receiver may be less inclined to communicate with the sender, resulting in a delayed response or no response at all. As a result, both the sender and receiver are not efficient with available time and system resources.

Further, different communication methods may be provided by different service providers or vendors, which may not be interoperable with each other. Accordingly, when a sender attempts to contact a receiver by a particular communication method provided by a particular vendor, that particular vendor responds to the request without relying on any additional information from other vendors. Without this additional information, vendors are precluded from providing effective utilization of available communication systems.

For example, if the sender attempts to place a telephone call to the receiver, the vendor that provides the telephone service is unable to read a presence status on an instant messaging system that indicates that the receiver has set a do-not-disturb mode. As a result, the telephone service vendor may allow the call to go through, which may interrupt the receiver at an inopportune time. While the sender may have had no idea that the receiver set the do-not-disturb mode on the instant messaging system, the receiver is nevertheless interrupted even after positively setting a do-not-disturb mode, albeit on a different system. As a result, the receiver may be inconvenienced and therefore less willing to communicate and cooperate with the sender, particularly if this is the sender's first attempted contact and the sender and receiver do not yet have an established relationship.

The disclosed system provides for predicting preferred communication patterns. Users may utilize an integrated communications system that supports multiple methods of communication. The integrated communications system can track several data points for all users on the integrated communications system, including presence, real-time activity, communication history, location, calendar, device states, and group relationships. When a sender attempts to contact a receiver through the integrated communications system, the integrated communications system can predict a preferred communication method of the receiver based on one or more of the tracked data points. If the sender is attempting to use a non-preferred communication method, the integrated communications system can provide a recommendation to the sender to use the preferred communication method.

The disclosed system addresses a technical problem tied to computer technology and arising in the realm of computer networks, namely the technical problem of determining a preferred communication method over a computer network. When a non-preferred communication method is utilized, then the receiver is less likely to respond to the communication, causing redundant back and forth between the sender and receiver until the receiver provides a response. As a result, computing resources and network bandwidth are wasted on duplicative non-preferred communications rather than quickly resolving the communication with a preferred communication method.

The disclosed system solves this technical problem by providing an integrated communications system that supports multiple communication methods. By tracking user interactions and other data within the integrated communications system, a preferred communication method can be determined with a high degree of confidence. This preferred communication method can then be conveyed to a sender when the sender attempts to contact the receiver with a non-preferred communication method. The disclosed system thus improves the field of computer networks by predicting preferred communication patterns, thereby enabling users to communicate with preferred communication methods to efficiently utilize available system resources and network bandwidth.

Although certain examples provided herein may describe a user's information being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for predicting preferred communication patterns. The architecture 100 includes clients 110, users 120, servers 130, and network 150. Clients 110 include client 110A, client 110B, client 110C, and client 110D. Users 120 include user 120A and user 120B. Clients 110A-110D and servers 130 are connected over network 150.

One of the many servers 130 is configured to host an integrated communications system that supports communication between users 120 using a variety of different communication methods. For purposes of load balancing, multiple servers 130 can host the integrated communications system. The supported communication methods may include real-time interactive communication methods such as audio calls, video conferencing, screen sharing, presentations, and instant messaging. Non-interactive communication methods such as e-mail and texting may also be supported.

When a sender, for example user 120A, attempts to contact a receiver, for example user 120B, using a particular communication method via the integrated communications system provided by servers 130, servers 130 may receive the contact request from user 120A. Based on available data points for user 120B within the integrated communications system, servers 130 can determine a communication preference hierarchy for user 120B, which represents a preferential ordering of communication methods. When the communication preference hierarchy includes other communication methods that are more highly preferred than the particular communication method, then servers 130 may select one of those other communication methods for providing a recommendation to user 120A. Optionally, a new contact request may be automatically generated using the recommendation, and the original contact request may be denied. In this manner, users are steered towards using preferred communications patterns, facilitating user responsiveness and optimal utilization of available hardware resources and network bandwidth.

As shown in architecture 100, a user may be associated with multiple devices. For example, user 120B may be associated with client 110B, a desktop computer, client 110C, a mobile phone, and client 110D, a Public Switched Telephone Network (PSTN) telephone or a Voice over Internet Protocol (VoIP) telephone. Each of these devices may provide data points for determining a communication preference hierarchy for user 120B. Further, when a communication is initiated with user 120B, a particular device may be selected for communicating in accordance with the determined communication preference hierarchy.

The servers 130 can be any device having an appropriate processor, memory, and communications capability for hosting the integrated communications system. The clients 110 to which the servers 130 are connected over the network 150 can be, for example, desktop computers, mobile computers, tablet computers (e.g., including e-book readers), mobile devices (e.g., a smartphone or PDA), set top boxes (e.g., for a television), video game consoles, or any other devices having appropriate processor, memory, and communications capabilities. Clients 110 may include touchscreens, pen digitizers, or other devices for receiving input from the hands of users 120. In certain aspects, one or more of the servers 130 can be a cloud computing server of an infrastructure-as-a-service (IaaS), and be able to support a system-as-a-service (PaaS) and software-as-a-service (SaaS) services.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Predicting Preferred Communication Patterns

Figure 2:
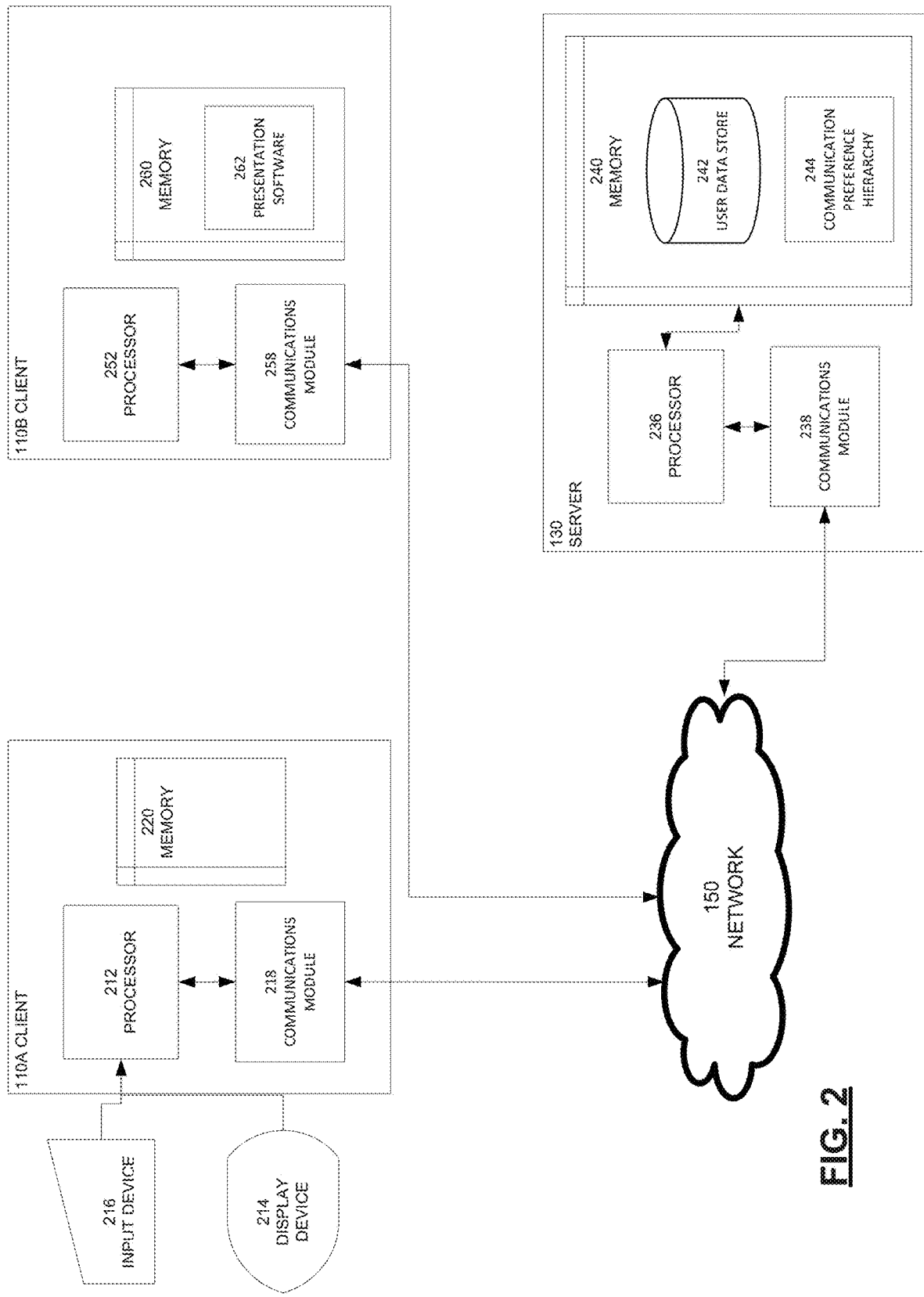
FIG. 2 is a block diagram illustrating the example client and server from the architecture of FIG. 1 according to certain aspects of the disclosure.

FIG. 2 is a block diagram illustrating an example server 130 and client 110A and client 110B from the architecture of FIG. 1 according to certain aspects of the disclosure. The client 110A, client 110B, and server 130 are connected over the network 150 via respective communications modules 218, 258, and 238. The communications modules 218, 258 and 238 are configured to interface with the network 150 and to receive information, such as data, requests, responses, and commands to other devices on the network. The communications modules 218, 258, and 238 can be, for example, modems or Ethernet cards.

Server 130 includes processor 236, communications module 238, and memory 240, which includes user data store 242 and communication preference hierarchy 244. The processor 236 of the server 130 is configured to execute instructions, such as instructions physically coded into the processor 236, instructions received from software in memory 240, or a combination of both. For example, the processor 236 of the server 130 executes instructions to receive a request from a first user to initiate communication with a second user by a first communication method. For example, referring to FIG. 1, processor 236 of server 130 may receive a request from client 110A associated with user 120A to initiate communication with client 110B associated with user 120B via instant messaging.

Processor 236 of server 130 determines communication preference hierarchy 244 of user 120B based on a plurality of factors concerning user 120B. For example, user data store 242 may include various data points concerning users of the integrated communications system, such as user 120B. The data points may also concern non-users, for example third party contacts that are only accessible via external telephone numbers or e-mail addresses. The plurality of factors concerning user 120B may include these various data points, which may include a presence state of user 120B and real-time information for associated devices, or clients 110B, 110C, and 110D. Based on these factors, a communication preference hierarchy 244 may be determined, for example by assigning a preference score to each method of communication available for communicating with user 120B on the integrated communications system, wherein a higher numeric score indicates that user 120B is more likely to prefer that communication method. An example communication preference hierarchy 244 is illustrated below in Table 1:

TABLE 1

Example Communication Preference Hierarchy for User 120B

| Communication Method | Preference Score |
|---|---|
| Text message to mobile device | 90 |
| E-mail to mobile device and desktop | 50 |
| Voice call to telephone | 20 |
| Instant message to desktop computer | 10 |

Processor 236 of server 130 selects a second communication method from communication preference hierarchy 244, wherein the second communication method is preferred over the first communication method in communication preference hierarchy 244. Recall that the first communication method is instant messaging to client 110B. As shown in Table 1 above, an instant message to desktop corresponds to a preference score of 10 for user 120B. Thus, there are three other methods of communication with a preference score higher than 10 that can be chosen as the second communication method. For example, "text message to mobile device" with a preference score 90 may be chosen. Note that if the first communication method is already the most preferred communication method for user 120B, then the integrated communications system may simply service the original contact request from user 120A.

Processor 236 of server 130 provides, in response to the request from client 110A, a recommendation to user 120A to communicate with user 120B by sending a text message to client 110C. For example, before user 120A uses input device 216 to complete an instant message, display device 214 of client 110A may display a recommendation received from server 130, wherein the recommendation indicates that user 120B may not be responsive to an instant message to desktop, but may be more receptive to a text message to mobile. Optionally, the recommendation may be automatically put into effect by converting the instant message into a text message for sending to client 110C, and the original request for sending an instant message to client 110B may be denied.

The sender or client 110A is associated with user 120A and includes processor 212, communications module 218, and memory 220. The client 110A also includes an input device 216, such as a keyboard or mouse, and a display device 214. The processor 212 of the client 110A is configured to execute instructions, such as instructions physically coded into the processor 212, instructions received from software in memory 220, or a combination of both. For example, the processor 212 of client 110A may execute client software that interfaces with the integrated communication system hosted on servers 130. The client software may send a contact request to servers 130 in response to a request from user 120A to communicate with a particular user, such as user 120B, using a particular communication method.

The receiver or client 110B is associated with user 120B and includes processor 252, communications module 258, and memory 260, which includes presentation software 262. The client 110B may also include an input device and an output device, which are not specifically shown in FIG. 2. The processor 252 of the client 110B is configured to execute instructions, such as instructions physically coded into the processor 252, instructions received from software in memory 260, or a combination of both. For example, the processor 252 of client 110B may execute client software that interfaces with the integrated communication system hosted on servers 130. The client software may establish a communication between client 110B and client 110A using a preferred communication method determined by the integrated communication system on servers 130.

Although not specifically shown in FIG. 2, other users and associated clients may also be in communication with servers 130 over network 150. The other clients may include components similar to those shown in client 110A and client 110B in FIG. 2.

In one or more aspects of the subject technology, server 130 includes a memory 240 including a user data store 242 concerning client 110B (associated with user 120B), and a processor 236 configured to execute instructions which, when executed, causes processor 236 to receive a request from client 110A (associated with user 120A) to initiate communication with user 120B by a first communication method. For example, processor 236 may execute a service to support the integrated communication system by receiving and processing communication requests from clients 110. Client 110A may receive typing from user 110A in an instant message window directed to user 120B. Client 110A generates a corresponding communication request, which may be sent to server 130 over network 150 before user 120A finishes typing. Server 130 receives this communication request, which indicates that user 120A desires to initiate communication with user 120B via instant messaging. The request may also include the partially finished message and an indication that user 120A has not yet finished typing the message.

The instructions also cause processor 236 to determine communication preference hierarchy 244 of user 120B based on user data store 242 concerning user 120B, wherein user data store 242 includes a presence state and at least one of real-time activity, communication history, location, calendar, device states, or group relationships. As discussed above, one example implementation of communication preference hierarchy 244 associates a numeric preference scores to each method of communication available for communicating with user 120B on the integrated communications system. These preference scores can be set and modified according to the data points available in data store 242 concerning user 120B, which can include relationships with other users and membership in particular groups.

The instructions also cause processor 236 to select a second communication method from communication preference hierarchy 244, wherein the second communication method is preferred over the first communication method in communication preference hierarchy 244. Continuing with the example of preference scores, a preferred method is a method that is assigned a higher numeric preference score. Thus, the second communication method may be selected based on having a higher preference score compared to the first communication method within communication preference hierarchy 244. In some implementations, the second communication method may be selected based on a having a highest preference score within communication preference hierarchy 244.

The instructions also cause processor 236 to provide, in response to the request from client 110A (associated with user 120A), a recommendation to user 120A to communicate with user 120B by the second communication method. For example, the recommendation may include an explanation that the first communication method is not an ideal method of communication for user 120B at the moment, and that user 120B would be more receptive to the second communication method.

In a further aspect of the subject technology, processor 236 is further configured to initiate a new communication with user 120B by the second communication method in response to a confirmation of the recommendation by client 110A (associated with user 120A). For example, in some implementations, the recommendation may be an interactive recommendation that triggers a new communication request using the second communication method when user 120A confirms the recommendation, for example by clicking on the recommendation.

In a further aspect of the subject technology, processor 236 is further configured to deny the request from client 110A (associated with user 120A) to initiate communication with client 110B (associated with user 120B) by the first communication method. For example, a send button for sending instant messages to user 120B may be disabled to prevent communications by the first communication method.

In a further aspect of the subject technology, the first communication method is a real-time communication method. Real-time communication methods may include voice, video conferencing, instant messaging, and other methods of communication where communicating parties can expect a response from other parties in near real-time.

In a further aspect of the subject technology, the first communication method is directed to client 110B of user 120B, and the second communication method is directed to a second device (e.g. client 110C or client 110D) of user 120B. In this manner, a communication request can be redirected to a different device associated with user 120B that may be preferable for user 120B. For example, if the user is currently performing a presentation on a desktop computer, the communication request can be directed to a mobile phone instead.

In a further aspect of the subject technology, prior to the determining communication preference hierarchy 244, processor 236 is further configured to determine the presence state of user 120B using multiple points of presence (MPOP) for user 120B. For example, a presence state can be requested and determined from all devices associated with user 120B, or clients 110B, 110C, and 110D. Based on these individual presence states, a multiple points of presence (MPOP) state can be determined for user 120B. To provide one example, if only client 110C has a "do not disturb" mode enabled, then the MPOP state can be set to "do not disturb", which applies to all devices of user 120B. In another example, if client 110B and client 110D are in an "idle away" state but client 110C has recent activity, then the MPOP state can be set to "available", since at least one device is still recently active.

The techniques described herein may be implemented as method(s) that are performed by physical computing device(s), as one or more non-transitory computer-readable storage media storing instructions which, when executed by computing device(s), cause performance of the method(s), or, as physical computing device(s) that are specially configured with a combination of hardware and software that causes performance of the method(s).

Figure 3A:
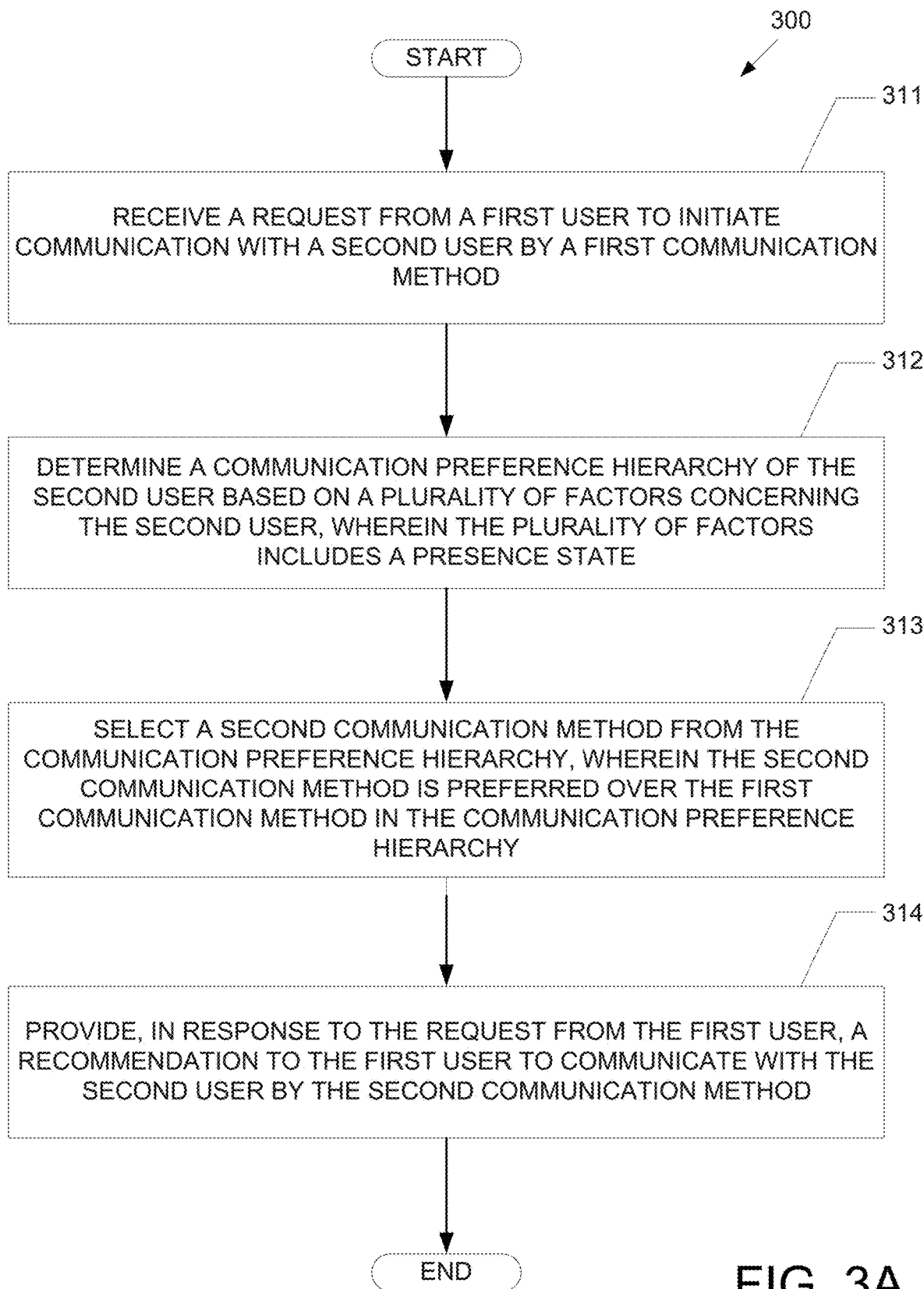
FIG. 3A illustrates an example process for predicting preferred communication patterns using the example server of FIG. 2.

FIG. 3A illustrates an example process 300 for predicting preferred communication patterns using the example server 130 of FIG. 2. While FIG. 3A is described with reference to FIG. 2, it should be noted that the process steps of FIG. 3A may be performed by other systems.

Figure 4A:
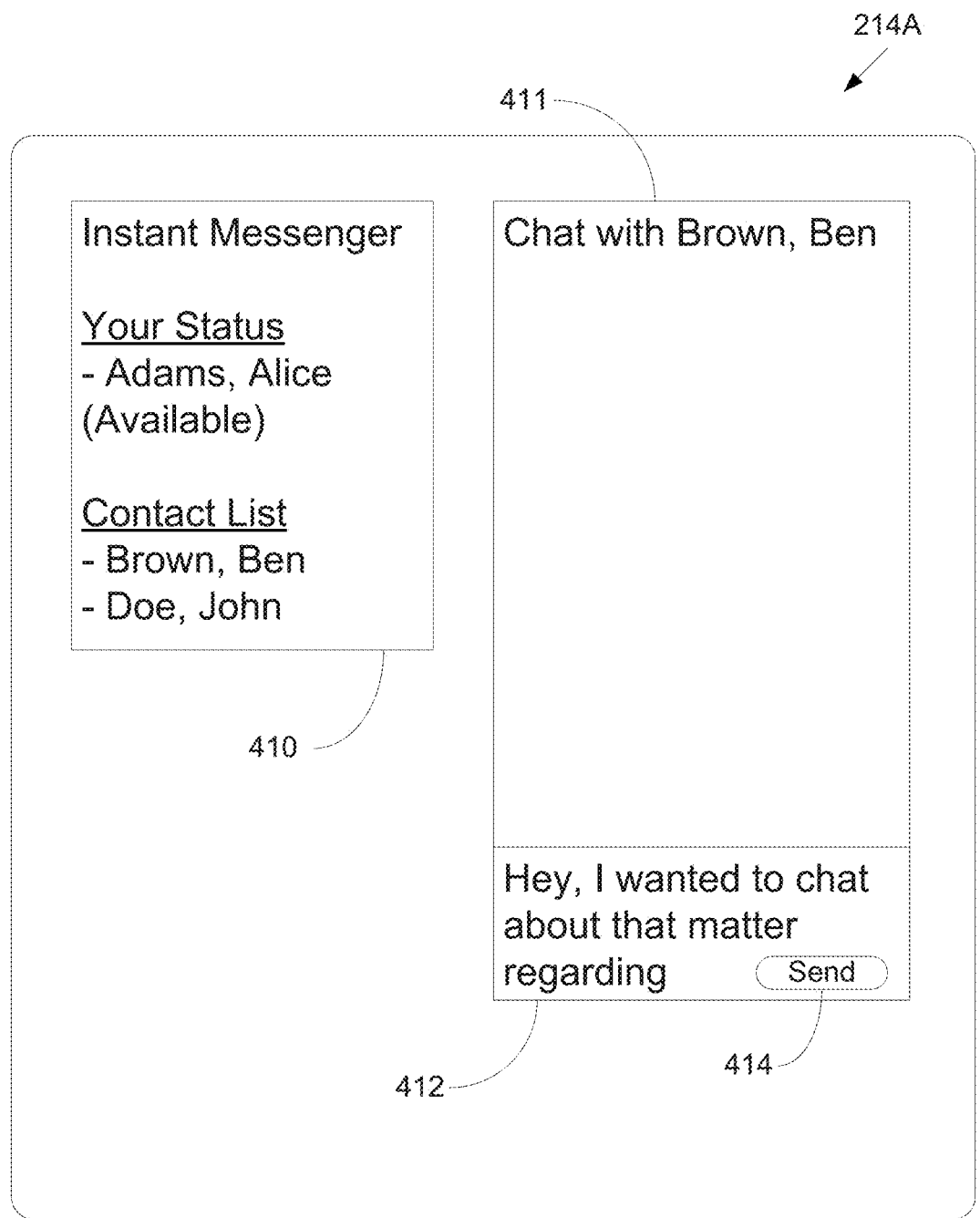
FIG. 4A, FIG. 4B and FIG. 4C illustrate example user interfaces for practicing the example process of FIG. 3A.

The process 300 begins by proceeding to step 311, where processor 236 receives a request from client 110A, via user 120A, to initiate communication with user 120B by a first communication method, or by instant message. For example, referring to FIG. 4A, FIG. 4A illustrates an example user interface for practicing the example process of FIG. 3A. Display device 214A of FIG. 4A includes instant messenger interface 410, messaging window 411, text box 412, and send button 414.

User 120A or the user named "Adams, Alice" may begin by selecting "Brown, Ben" or user 120B from the contacts list in instant messenger interface 410. After selecting "Brown, Ben", messaging window 411 may appear on display device 214A, and user 120A may begin typing into text box 412 using input device 216. Client 110A may send the contents of text box 412 to server 130 as user 120A types. Thus, client 110A may not wait until user 120A uses send button 414 to begin sending a contact request to server 130. Server 130 receives a contact request from client 110A, wherein the contact request indicates that user 120A ("Adams, Alice") wants to initiate communication with user 120B ("Brown, Ben") via instant message.

As shown in FIG. 1, user 120B may own or be associated with several devices, or client 110B, client 110C, and client 110D. In this case, server 130 may determine a particular target device that the contact request is being directed. For example, a method of communication, such as instant messaging, may be restricted to a particular type of device, such as desktop computers. Server 130 may thus interpret the contact request of step 311 as being directed to client 110B (desktop computer), rather than to client 110C (mobile phone) or to client 110D (PSTN or VoIP telephone). When the target device is ambiguous, server 130 may use data available in user data store 242 to determine the target device or devices. Thus, in some aspects of the present technology, server 130 may further determine the particular device or client that a contact request is directed.

Figure 3B:
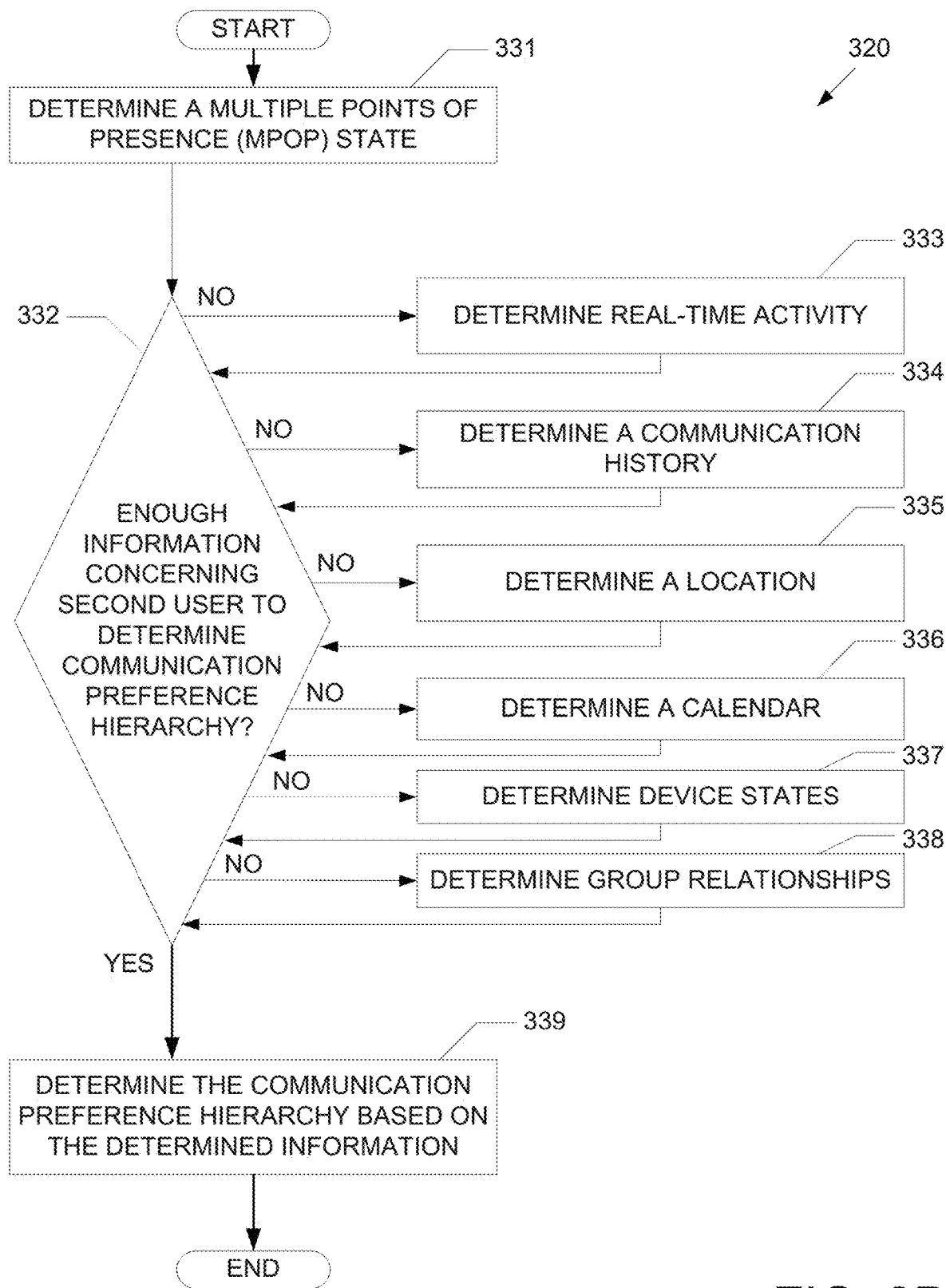
FIG. 3B illustrates an example process for determining a communication preference hierarchy using the example server of FIG. 2.

In step 312, processor 236 determines communication preference hierarchy 244 of user 120B based on user data store 242 concerning user 120B, wherein user data store 242 includes a presence state of user 120B. For example, referring to FIG. 3B, FIG. 3B illustrates an example process 320 for determining communication preference hierarchy 244 using the example server 130 of FIG. 2. While FIG. 3B is described with reference to FIG. 2, it should be noted that the process steps of FIG. 3B may be performed by other systems.

The process 320 begins by proceeding to step 331, where processor 236 determines a multiple points of presence (MPOP) state of user 120B. For example, server 130 can request a presence state, if available, from client 110B, client 110C, and client 110D to determine the MPOP state. Client 110B may indicate that user 120B is "available" based on a status set in instant messenger interface 410. Instant messenger interface 410 may also allow user 120B to set other presence states, such as "busy" or "do not disturb". Further, based on recent activity (or lack thereof) on client 110A and/or calendar information in user data store 242, the presence state may be set to "away", "out of office", or another state. Client 110C and client 110D may also indicate a presence state of "available" rather than "do not disturb" or some other unavailable state. Thus, the MPOP state may be determined to be "available" for user 120B.

In step 332, processor 236 determines whether there is enough information concerning user 120B to determine communication preference hierarchy 244. In certain edge cases, for example when user 120B is only reachable by a single method of communication, processor 236 may determine that the answer to step 332 is "yes" and may immediately proceed to step 339. However, in most cases, just determining the MPOP state of user 120B is not enough to determine communication preference hierarchy 244, and more information is needed.

When processor 236 determines that more information is needed in step 332, any of steps 333-338 may be carried out to gather additional data points from user data store 242. Steps 333-338 may be carried out in a predetermined order, or in an order that minimizes steps to reach step 339, or by another ordering. For example, calendar information may include dispositive information that may quickly end the information query, for example when the calendar information indicates that user 120B is currently on vacation. In this case, step 336 may be carried out earlier than other steps in steps 333-338.

Examining the information gathering steps 333-338 in greater detail, in step 333, processor 236 determines real-time activity of user 120B. Real-time activity may include, for example, whether user 120B is currently conducting a phone call over client 110D, whether user 120B is currently attending a video conference or webinar on client 110B, whether user 120B is currently participating in a conference call on client 110B, client 110C, or client 110D, whether user 120B is currently sharing a screen or providing a presentation on client 110B, whether user 120B is currently viewing a text message or instant message, or whether user 120B is otherwise actively interacting with the integrated communication system provided by server 130.

For example, referring to FIG. 2, processor 236 may request a real-time activity state from client 110B. Client 110B may respond that client 110B is currently executing presentation software 262 and that user 120B is currently sharing a screen of presentation software 262 to other users over the integrated communication system. Similar requests may be issued to other devices of user 120B, such as client 110C and client 110D, and the corresponding real-time activity states may be received for updating and storing in user data store 242. The real-time activity state of user 120B may thus be determined to be "in a presentation" based on the data stored in user data store 242. When user 120B is not actively engaged with the integrated communication system, then the real-time activity state may be determined to be "inactive".

Since step 333 indicates that user 120B is currently engaged with presentation software 262 on client 110B, communication methods that are directed towards client 110B may be determined to be less desirable for user 120B, who would likely prefer to avoid interruptions while presenting on client 110B. Preference scores for communication methods directed towards client 110B may therefore be decreased accordingly during step 339, for example by using a small weighting multiplier or assigning a smaller initial value.

In step 334, processor 236 determines a communication history of user 120B. For example, based on past behavior of user 120B at various times of the day, processor 236 may determine communication habits for user 120B, such as how quickly user 120B tends to respond to various communication methods at various times of the day. For example, processor 236 may determine that user 120B usually responds quickly to all communication methods between 9 AM-12 PM and between 1 PM-6 PM, but usually does not respond outside of those times. Thus, processor 236 may determine the usual business hours of user 120B as 9 AM-6 PM, with a lunch break at 12 PM-1 PM. Accordingly, in step 339, a higher weight may be given to real-time communication methods during business hours, whereas a higher weight may be given to non-real-time communication methods outside of business hours and during lunch break.

Processor 236 may also determine that user 120B responds more quickly to one communication method versus another communication method, for example by providing quicker responses to instant messages versus e-mail. Processor 236 may also determine an average response time for a particular communication method. For example, processor 236 may determine how often user 120B checks voicemail, and an average time for a callback after checking voicemail. Step 339 may adjust weights accordingly for associated communication methods in step 339.

In step 335, processor 236 determines a location of user 120B. This can be implied by calendar information determined in step 336. For example, if the calendar information indicates that user 120B has a normal work schedule for today, then the location of user 120B may be determined to be an associated office when the current time is during business hours. Alternatively, the location may be determined using more direct methods, for example by reading a location sensor, such as a global positioning sensor (GPS) of client 110B, client 110C, or client 110D. In another example, the location of user 120B may be triangulated according to wireless connections, for example by detecting a presence of client 110C at a particular location using Bluetooth, Wi-Fi, cellular, near-field communication, or another technology. Based on the determined location, an associated time zone may be determined, which may adjust the business hours determined in step 334.

Further, the location may be used to determine whether user 120B is in transit, for example driving, flying, taking a train or using some other method of transit. This determination may also be assisted by the communication history in step 334 and the calendar in step 336. For example, if the current time is near the beginning of business hours, then a higher confidence may be made that user 120B is in transit to work. If a determination is made that user 120B is actively driving on a road, then communication methods directed towards client 120C may be assigned a zero preference score to prevent distractions while user 120B is driving.

In step 336, processor 236 determines a calendar of user 120B. For example, user 120B may use the integrated communications system to schedule meetings and other events, or to notify others of vacation days, travel, or other out-of-office activities. Processor 236 may examine this information to determine whether user 120B is currently free or attending a scheduled event, and when a next free time slot is available. The preferred communication methods can then be adjusted accordingly in step 339.

In step 337, processor 236 determines device states for user 120B. For example, processor 236 may request a present state and last activity time from client 110B, client 110C, and client 110D. For example, if client 110B and client 110D do not report any activity within the last few hours but client 120C reports recent activity, then processor 236 may determine that user 120B is out of the office but has access to client 110C, in which case communication methods to client 120C may be favored in step 339. In another example, client 110B may report recent activity but no communication activity, which may indicate that user 120B is working but available for communications. In this case, communication methods to client 110B may be favored in step 339.

Step 337 may also reduce preference scores for particular communication methods. For example, client 110B may report that a web camera is connected and active, which may indicate that user 120B is already participating in a video conference. In this case, communication methods to client 110B may be disfavored in step 339. In another example, client 110D may report that a speaker phone or external headset is active, which may indicate that user 120B is already participating in an audio call. In this case, communication methods to client 110D may be disfavored in step 339.

In step 338, processor 236 determines group relationships for user 120B. For example, when the integrated communication system is used for a particular organization or business, then the activity of all of the members or employees of that grouping may be known to the integrated communication system, along with hierarchical relationships such as departments, team leaders, supervisors, co-workers, and others. Thus, processor 236 may determine which users supervise user 120B or which users that user 120B responds to within an organization. When user 120B is unavailable for some reason, such as being on vacation, then the group relationships can be utilized to determine an alternative contact as a possible preferred communication method. In another example, if user 120A does not have an established relationship with user 120B, an alternative contact may be provided as a preferred communication method when user 120B is known to be unresponsive to users without an existing relationship. For example, the alternative contact may correspond to a secretary or supervisor of user 120B.

After one or more steps 333-338 are carried out and the answer to step 332 is "yes", then in step 339, processor 236 may determine communication preference hierarchy 244 based on the information determined in steps 331 and 333-338. As discussed above, communication preference hierarchy 244 may be expressed as preference scores for each available method of communication for user 120B, as shown in Table 1 above. The preference scores may be calculated, for example, by assigning the available communication methods a score value that is increased, decreased, or weighted based on the various factors determined in steps 331 and 333-338.

While an iterative approach is shown in process 320, other alternative approaches may also be utilized. For example, all of the information from steps 333-338 may be gathered as a matter of course and processed through a machine learning algorithm to determine communication preference hierarchy 244. The particular approach to utilize may depend on available computing resources and whether suitable training data is available.

Returning to FIG. 3A, in step 313, processor 236 selects a second communication method from communication preference hierarchy 244, wherein the second communication method is preferred over the first communication method in communication preference hierarchy 244. Using the example in Table 1 above, the first communication method corresponds to "Instant message to desktop computer", which is assigned a preference score of 10. A second communication method corresponding to "Text message to mobile device" may be selected, which is assigned a preference score of 90. Thus, the second communication method corresponds to sending a text message to client 110C. As shown by the preference scores, the second communication method (score 90) is preferred over the first communication method (score 10).

Figure 4B:
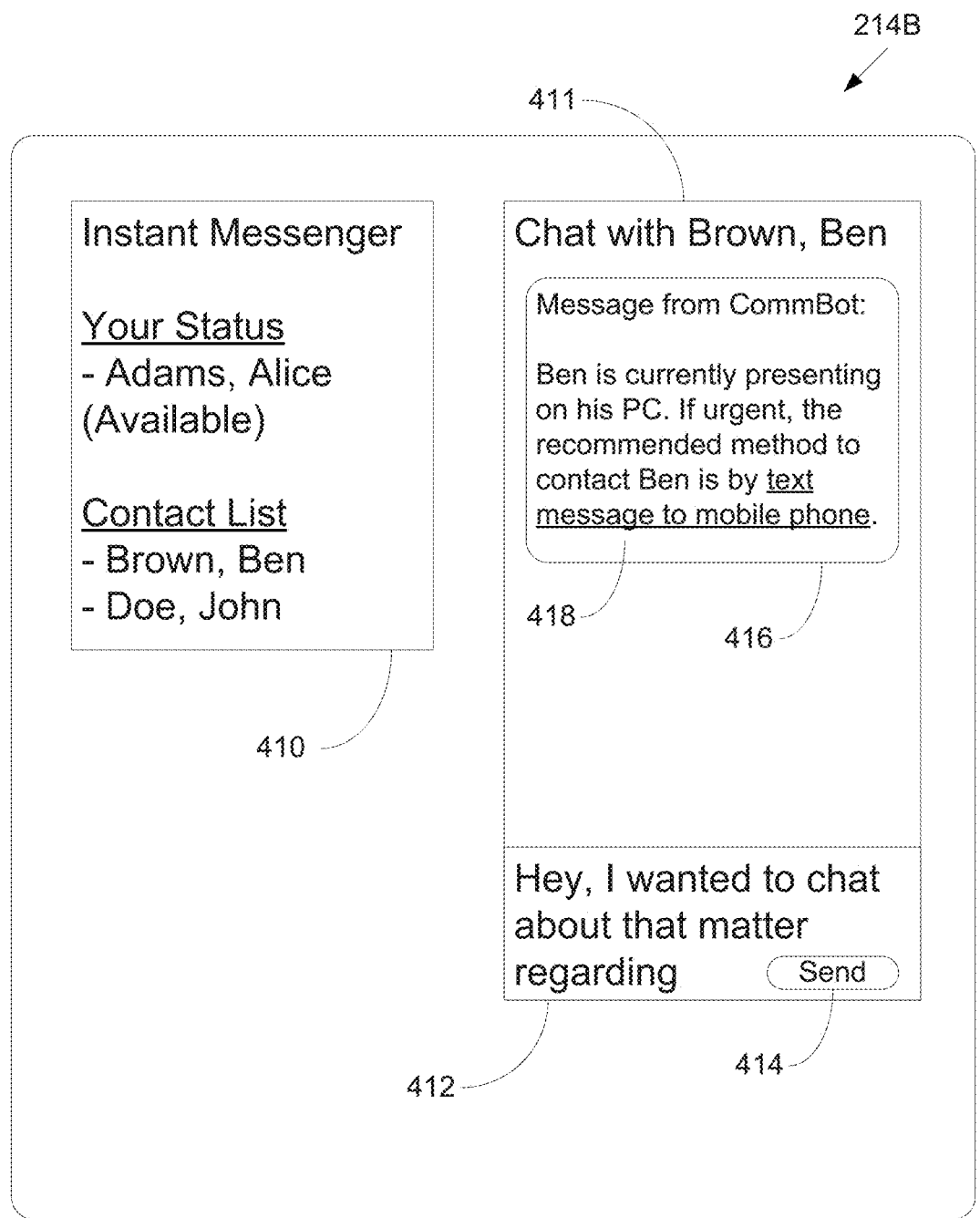

In step 314, processor 236 provides, in response to the request from user 120A, a recommendation to user 120A to communicate with user 120B by the second communication method. Server 130 provides the recommendation to client 110A, which in turn displays the recommendation on display device 214. After step 314, process 300 ends. For example, referring to FIG. 4B, FIG. 4B illustrates an example user interface for practicing the example process of FIG. 3A. Display device 214B of FIG. 4B includes instant messenger interface 410, messaging window 411, text box 412, send button 414, recommendation message 416 and preferred communication method 418.

As shown in display device 214B, messaging window 411 of FIG. 4A is updated to display a recommendation message 416 in FIG. 4B, which is provided by "CommBot", an automated message robot provided by the integrated communications system. In recommendation message 416, user 120A is informed that user 120B or Ben is currently presenting on his PC, and therefore now is not a good time for an instant message to his PC. Instead, recommendation message 416 suggests the second communication method selected in step 313 as preferred communication method 418, or "text message to mobile phone". While recommendation message 416 only shows a single preferred communication method 418 in this example, in other aspects of the present technology, multiple preferred communication methods may be recommended.

Note that recommendation message 416 may be provided back to user 120A using the same communication method as the first communication method, or instant messaging in this example. In this manner, the context of recommendation message 416 can be readily understood. For example, if the first communication method was instead a voice call, then recommendation message 416 may be provided to user 120A as a voice message.

Figure 4C:
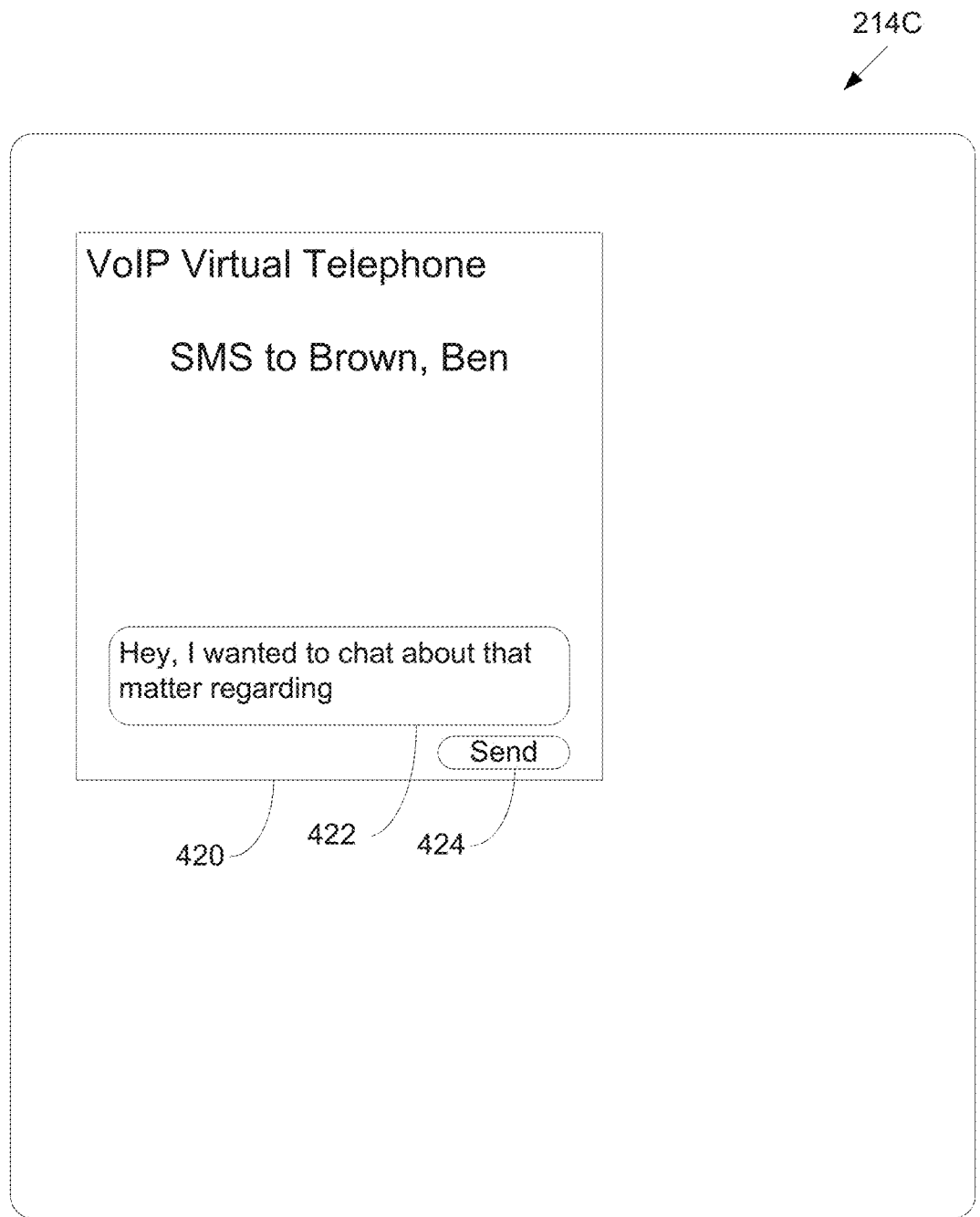

When user 120A confirms recommendation message 416 by clicking on preferred communication method 418, then display device 214B of FIG. 4B may transition to display device 214C of FIG. 4C. For example, referring to FIG. 4C, FIG. 4C illustrates an example user interface for practicing the example process of FIG. 3A. Display device 214C of FIG. 4C includes VoIP application window 420, text box 422, and send button 424.

As shown in display device 214C, a VoIP application window 420 is shown and text from text box 412 may be copied into text box 422. User 120A may continue to write into text box 422 to finish the message and click on send button 424 to send a short message service (SMS) text message to client 120C. User 120B may continue his presentation on client 110B while noticing that he received a SMS text message on client 120C. Depending on the urgency of the SMS text message, user 120B can reply to the SMS text message or defer action until after the completion of the presentation. In either case, user 120B is happy that he was not interrupted on client 110B.

In some aspects of the subject technology, server 130 may perform actions to actively prevent user 120A from using the non-preferred first communication method. For example, as shown in display device 214C, the instant messenger interface 410 and messaging window 411 from FIG. 4B may be closed or minimized, and text box 412 may be cleared to prevent instant messages from being sent to user 120B. Additionally or alternatively, send button 414 may be temporarily disabled while it is determined that the first communication method is still a non-preferred communication method.

Having established a detailed description of process 300, it may be helpful to provide an additional summarized example. For example, assume that a user is trying to contact a user "Leo" by instant message through the integrated communications system. Referring to process 320, in step 331, a MPOP state for Leo is determined to be "do not disturb". In step 333, real-time activity of Leo's devices indicate that Leo is not currently using any of his devices. In step 334, a communication history for Leo's devices indicates no interactions with the integrated communications system in the last 4 days. In step 335, Leo's location is determined to be someplace that is not home or work. In step 336, Leo's calendar indicates that Leo is on vacation until Sep. 25, 2017. In step 337, the device states in step 337 indicate that Leo has not recently used any of his devices with the integrated communications system. In step 338, the group relationships indicate that Leo belongs to the "Product Organization" group and "Elizabeth" is his secretary.

A preferred communication hierarchy may be generated that prefers non-real-time communication methods (e.g. e-mail) and prefers communications to alternative contacts. The "CommBot" may provide a recommendation that states: "Leo is out of the office on vacation until Sep. 25, 2017. Leo will not be able to respond promptly to your messages or take your calls. E-mail is the recommended communications method. If this is urgent, please send an e-mail to the Product Organization group to reach one of his co-workers, or to his secretary Elizabeth." Thus, three preferred communication methods are provided: e-mail to Leo, e-mail to Product Organization, and e-mail to Leo's secretary Elizabeth. Once the user confirms one of the recommendations, the body text of the instant message may be copied into a new e-mail that is addressed to the selected recipient. Note that the recommendation is provided automatically by server 130 based on the information found in user data store 242. Thus, there is no need for Leo to specifically draft a vacation auto-response.

Hardware Overview

Figure 5:
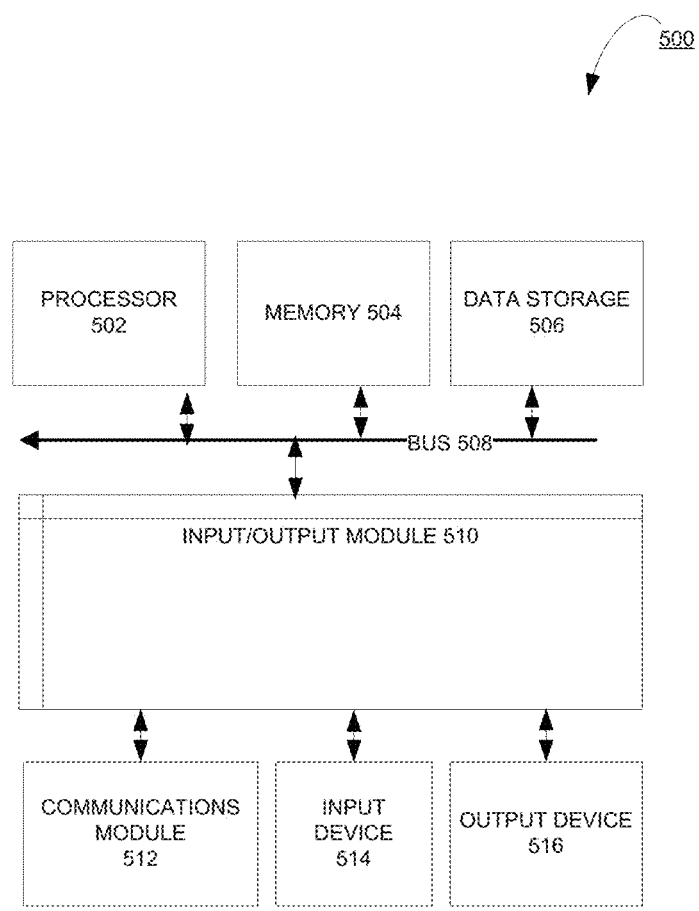
FIG. 5 is a block diagram illustrating an example computer system with which the server of FIG. 2 can be implemented.

FIG. 5 is a block diagram illustrating an example computer system 500 with which the client 110A, client 110B, and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A, client 110B, and server 130) includes a bus 508 or other communication mechanism for communicating information, and a processor 502 (e.g., processor 212, 252, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 260, and 240), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (GPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for predicting preferred communications patterns, the method comprising:
   receiving, in a remote server, a request from a first user to initiate communication with a second user by a first communication method;
   determining a communication preference hierarchy of the second user based on a plurality of factors concerning the second user, wherein the plurality of factors comprises a presence state;
   selecting a second communication method from the communication preference hierarchy, wherein the second communication method is selected based on a determination that the second communication method is preferred over the first communication method in the communication preference hierarchy;
   from the remote server, in response to a determination that the first communication method is a non-preferred communication method of the communication preference hierarchy, actively preventing the first user from using the first communication method for communication with the second user;
   providing, in response to the request from the first user and based on the determination that the second communication method is preferred over the first communication method, a recommendation to the first user to communicate with the second user by the second communication method; and
   in response to a confirmation of the recommendation by the first user, initiating a new communication with the second user by the second communication method, wherein the recommendation is provided to the first user using the first communication method.

2. The computer-implemented method of claim 1, wherein the plurality of factors comprises at least one of real-time activity, communication history, location, calendar, device states, or group relationships.

3. The computer-implemented method of claim 1, wherein the method further comprises:
   denying the request from the first user to communicate with the second user by the first communication method.

4. The computer-implemented method of claim 1, wherein the first communication method is a real-time communication method.

5. The computer-implemented method of claim 1, wherein the first communication method is directed to a first device of the second user, and wherein the second communication method is directed to a second device of the second user.

6. The computer-implemented method of claim 1, wherein the presence state is determined using multiple points of presence (MPOP) for the second user.

7. A system for predicting preferred communications patterns, the system comprising:
   a memory comprising a plurality of factors concerning a second user; and
   a processor configured to execute instructions which, when executed, cause the processor to:
   receive, in a remote server, a request from a first user to initiate communication with the second user by a first communication method,
   determine a communication preference hierarchy of the second user based on the plurality of factors concerning the second user, wherein the plurality of factors comprise a presence state and at least one of real-time activity, communication history, location, calendar, device states, or group relationships;

select a second communication method from the communication preference hierarchy, wherein the second communication method is selected based on a determination that the second communication method is preferred over the first communication method in the communication preference hierarchy;

from the remote server, in response to a determination that the first communication method is a non-preferred communication method of the communication preference hierarchy, actively prevent the first user from using the first communication method for communication with the second user;

provide, in response to the request from the first user and based on the determination that the second communication method is preferred over the first communication method, a recommendation to the first user to communicate with the second user by the second communication method; and in response to a confirmation of the recommendation by the first user, initiate a new communication with the second user by the second communication method, wherein the recommendation is provided to the first user using the first communication method.

8. The system of claim 7, wherein the processor is further configured to:

deny the request from the first user to communicate with the second user by the first communication method.

9. The system of claim 7, wherein the first communication method is a real-time communication method.

10. The system of claim 7, wherein the first communication method is directed to a first device of the second user, and wherein the second communication method is directed to a second device of the second user.

11. The system of claim 7, wherein prior to the determining the communication preference hierarchy, the processor is further configured to:

determine the presence state using multiple points of presence (MPOP) for the second user.

12. A non-transitory machine-readable storage medium comprising machine-readable instructions for causing a processor to execute a method for predicting preferred communications patterns, comprising:

receiving, in a remote server, a request from a first user to initiate communication with a second user by a first communication method, determining a communication preference hierarchy of the second user based on a plurality of factors concerning the second user, wherein the plurality of factors comprises a presence state and at least one of real-time activity, communication history, location, calendar, device states, or group relationships;

selecting a second communication method from the communication preference hierarchy, wherein the second communication method is selected based on a determination that the second communication method is preferred over the first communication method in the communication preference hierarchy;

from the remote server, in response to a determination that the first communication method is a non-preferred communication, actively preventing the first user from using the first communication method for communication with the second user;

providing, in response to the request from the first user and based on the determination that the second communication method is preferred over the first communication method, a recommendation to the first user to communicate with the second user by the second communication method, wherein the recommendation is provided to the first user using the first communication method; and in response to a confirmation of the recommendation by the first user, initiating a new communication with the second user by the second communication method, wherein the recommendation is provided to the first user using the first communication method.

13. The non-transitory machine-readable storage medium of claim 12, wherein the machine-readable instructions further cause the processor to:

deny the request from the first user to communicate with the second user by the first communication method.

14. The non-transitory machine-readable storage medium of claim 12, wherein the first communication method is a real-time communication method.

15. The non-transitory machine-readable storage medium of claim 12, wherein the first communication method is directed to a first device of the second user, and wherein the second communication method is directed to a second device of the second user.

16. The non-transitory machine-readable storage medium of claim 12, wherein prior to the determining the communication preference hierarchy, the machine-readable instructions further cause the processor to:

determine the presence state using multiple points of presence (MPOP) for the second user.

* * * * *